United States Patent [19]

Dennhoven et al.

[11] 4,047,035

[45] Sept. 6, 1977

[54] BAGGAGE INSPECTION DEVICE

[75] Inventors: Manfred Dennhoven, Wiesbaden; Claus Kunze, Taunusstein; Rainhard Kuehn, Wiesbaden, all of Germany

[73] Assignee: Heimann GmbH, Germany

[21] Appl. No.: 649,663

[22] Filed: Jan. 6, 1976

[30] Foreign Application Priority Data

July 18, 1975 Germany .............................. 2532218

[51] Int. Cl.² .......................................... G01M 23/22
[52] U.S. Cl. .................................. 250/355; 250/359; 250/460
[58] Field of Search .............. 250/409, 460, 354, 355, 250/359

[56] References Cited

U.S. PATENT DOCUMENTS

| 2,398,194 | 4/1946 | Sicular | 250/460 |
| 3,567,854 | 3/1971 | Tschantz | 250/409 |
| 3,783,286 | 1/1974 | Kremer | 250/409 |
| 3,808,444 | 4/1974 | Schneeberger | 250/460 |
| 3,894,235 | 7/1975 | Franke | 250/409 |
| 3,924,133 | 12/1975 | Reiss | 250/409 |

Primary Examiner—Harold A. Dixon
Attorney, Agent, or Firm—Hill, Gross, Simpson, Van Santen, Steadman, Chiara & Simpson

[57] ABSTRACT

A baggage inspection apparatus utilizing an X-ray generator for fluoroscopic examination of luggage and the like in which an X-ray detector is disposed in the beam path of the X-ray generator, operative to control switch means for switching off the high voltage of the X-ray beam generator in the event the intensity and/or duration of the X-ray radiation exceeds a predetermined value.

6 Claims, 4 Drawing Figures

BAGGAGE INSPECTION DEVICE

BACKGROUND OF THE INVENTION

The invention is directed to a device for the examination of luggage and the like by means of X-rays, emanating from an X-ray generator, which are directed upon and penetrate the piece of luggage or other object under inspection, to produce a fluoroscopic image on a translucent screen, which may be directly viewed or indirectly observed over a suitable television circuit.

Devices of this general type are already known, for example from U.S. Pat. No. 3,678,278. In connection with such inspection operations, a considerable problem arises with respect to the quantity of X-rays directed upon the object under inspection, as the uncontrolled application of such X-rays could result in damage to the contents of the luggage, in particular film and the like. Even in installations where the intensity of the X-ray beam is normally limited by suitably physical or electronic measures, for example by the utilization of intermittent application of the X-ray beam, hereinafter referred to as flash-type operation, an X-ray beam of greater intensity than desired can take place, for example as a result of defects or disturbances in the electronic system of the X-ray generator.

BRIEF SUMMARY OF THE INVENTION

The invention therefore has among its objects to provide a luggage inspection apparatus in which the objection under inspection is protected from over exposure to X-rays, even in the event of internal failure or problems in the apparatus. This is accomplished, in the present invention, by providing in a device such as that described, an X-ray detector which is disposed in the beam path of the X-ray generator, which is operative to disconnect the high voltage required in the X-ray generator when the intensity and/or duration of the emitted X-ray exceeds a predetermined value.

Preferably, the X-ray detector comprises a photoconductive cell coated with a luminescent material which is sensitive to X-ray radiation and which is disposed adjacent the edge of the outlet or discharge opening of the X-ray generator. A luminescent material suitable for this purpose is zinc-cadmium sulphide. However, other luminescent substances such as, for example, calcium wolframate also may be employed.

BRIEF DESCRIPTION OF THE DRAWINGS

In the drawings wherein reference characters indicate like or corresponding parts.

DETAILED DESCRIPTION OF THE INVENTION

Figure 1:
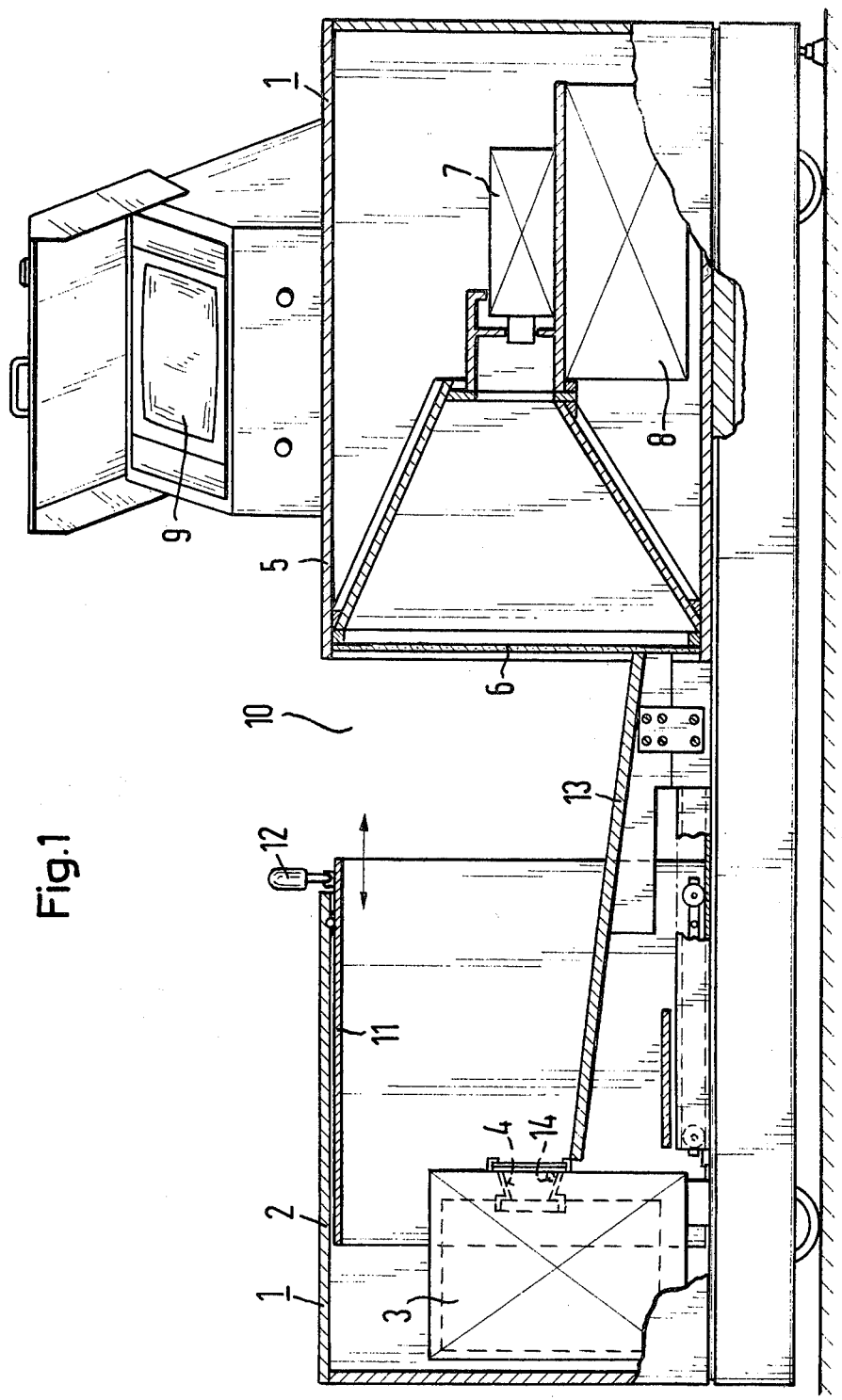
FIG. 1 illustrates an inspection device showing the internal structure thereof in longitudinal section.

Referring to FIG. 1, the luggage inspection and apparatus illustrated therein is provided with an exterior housing 1 which is constructed to shield the surroundings from X-rays generated in the device. The left-hand section 2 (as viewed in FIG. 1) which may be sheathed with lead foil or the like for achieving the desired shielding effect, contains an X-ray generator 3 which is provided with a conical opening 4 forming the beam outlet for the X-rays. Disposed in the right-hand section 5, of the housing 1 (as viewed in FIG. 1) is disposed a luminescent screen 6, at the rear or inner side of which is disposed a highly sensitive television camera 7, oriented to view the rear face of the screen 6. Also disposed in the section 5 is an electronic sub-unit 8 which primarily contains a control unit and a storer. In addition thereto, there is also provided on the right-hand section 5 of the housing 1 a structure which includes a television monitor 9.

The respective sections 2 and 5 are disposed in spaced relation to form an inspection space 10, into which the object to be inspected is disposed. The inspection space 10 is adapted to be enclosed by a readily movable covering hood 11, which, in the illustrated exemplary embodiment, is adapted to be moved from its open position illustrated in FIG. 1 to a closed position in which the inspection space 10 is completely closed. In the embodiment illustrated, the hood 11 is adapted to be manually moved from its illustrated open position to closed position by means of hand-grip 12. Following closure of the covering hood, a starting pulse is adapted to be produced which initiates operation of the X-ray generator 3 to discharge X-rays which penetrate the inspection object disposed on the floor 13 of the space 10, and thereby produce a fluoroscopic image on the luminescent screen 6, which in the embodiment illustrated is received by the highly sensitive camera 7 and electronically entered into the store of the unit 8. The stored image can now be viewed by means of the TV monitor 9 and may be constantly visible thereon until the next inspection operation.

The X-ray generator 3 preferably is an X-ray flash-type unit which is synchronized with the video signals of the TV camera 7. The flash-type unit has the advantage over a continuous wave generator in that the dosage of the emitted X-rays is initially inherently limited in time. However, even with a flash-type X-ray unit the intensity and/or duration of the emitted radiation can reach impermissible values, for example, as a result of disturbances of any kind, and in particular as a result of a defect in the electronic system.

In order to preclude such a possibility, which can lead to damage of items in the object being inspected, for example, film material, an X-ray detector 14 is disposed directly in the beam outlet opening 4 of the X-ray generator 3, the operation of which detector will be described in connection with FIGS. 2 and 3.

Figure 2:
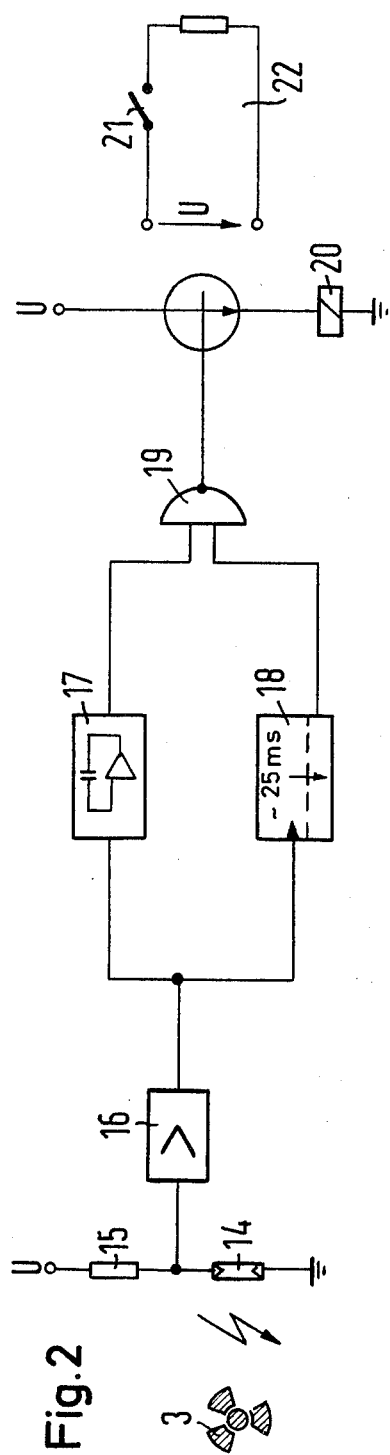
FIG. 2 is a block diagram of the internal circuit of the device illustrated in FIG. 1.

Referring to FIG. 2 the reference numeral 3 designates the X-ray generator of FIG. 1, which, following closure of the covering hood 11, emits the desired X-ray flashes. The X-ray detector 14, disposed in the beam path at the beam outlet opening 4 of the generator 3, is connected between ground and supply voltage terminal U in series with a relatively very high resistance 15. During emission of X-rays from the generator 3, the resistance value of the detector 14 decreases whereby a corresponding photoelectric current pulse is created which is conducted over a preamplifier 16 to an amplifier 17 which, in connection with a timing circuit 18 acts as an integration amplifier. The integration amplifier's output voltage is integrated at 19 and conducted to a suitable semiconductor or other type switch means, which, responsive to the output at 19, is operative to energize the winding of a relay 20 having normally closed contacts 21 which are disposed in the circuit 22 of the high voltage supply of the X-ray generator 3 and adapted to be opened upon energization of the winding.

The timing circuit 18 is so adjusted that with a proper dosage of the X-rays, the current pulse derived from the X-ray detector 14 has subsided before a new fluoroscoping operation begins. If, for example, as indicated in FIG. 3, the X-ray emanation is an X-ray flash 23 which does not exceed a predetermined duration, namely 10 ms, the output voltage 24 of the amplifier 17 will be such at the end of the timing pulse 25 that the switching means 20' will not be open and the relay de-energized, whereby the contacts 21 will remain closed.

Figure 3:
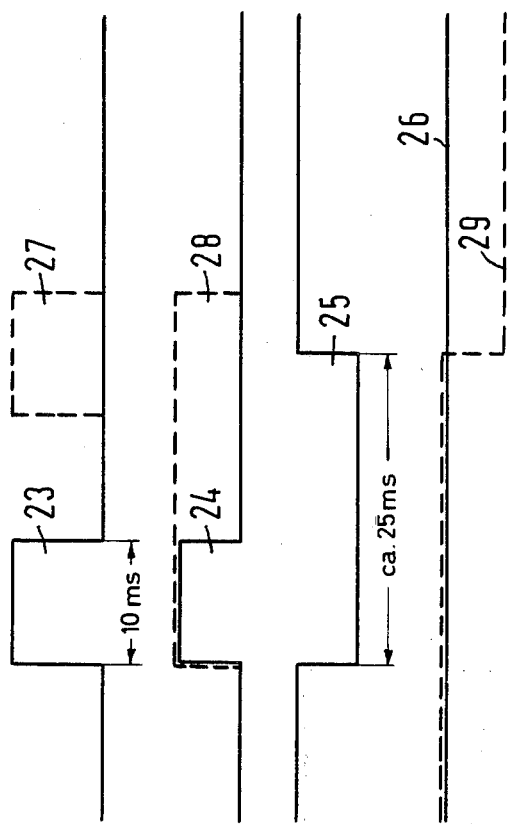
FIG. 3 is a time chart illustrating the operation of the circuit of FIG. 2.

This operation is represented in FIG. 3 by the extended straight line 26. However, if as a result of any error in the electronic system of the device, a further X-ray flash should occur as indicated by the broken line 27, the output of the amplifier 17 then may be represented by the broken line 28 whereby such output voltage 28 is present at the end of the pulse 25, resulting in actuation of the switching device 20', de-energization of the relay 20 and opening of the contacts 21 to disconnect the voltage supply U from the X-ray generator 1. The device thus cannot be again operated until the error has been found and corrected.

The circuit of FIG. 2 functions in a corresponding manner to that described, if instead of an additional X-ray flash, the intensity of the X-radiation emitted by the X-ray generator 1 exceeds a predetermined quantity. In other words, an increased intensity results in a stronger stimulation of the X-ray detector and as a result of after-glow effects supplies a longer photo-electric current so that again when a predetermined value is exceeded as determined by the timing circuit 18, the relay 20 will be de-energized. Consequently, the X-ray detector 14 and associated circuit, illustrated in FIG. 2, assures protection of an inspection object from radiation of undesirable strength or for an undesirable duration, independently of the operation of the generator 3, i.e. whether it is an X-ray flash-type unit or a keyed continuous wave generator.

Figure 4:
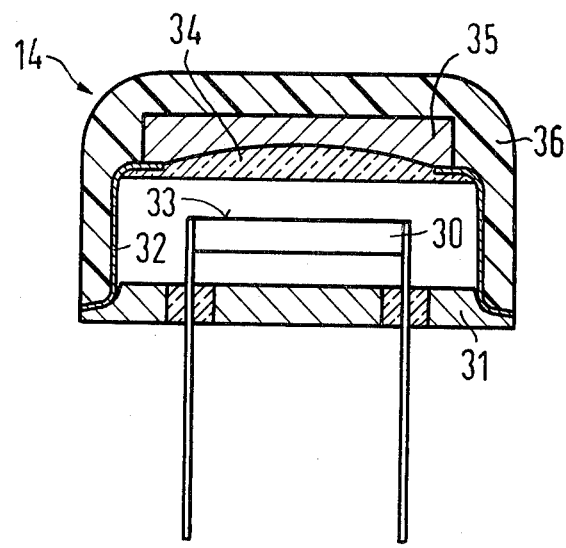
FIG. 4 is a transverse sectional view of an X-ray beam detector for use in a device as illustrated in FIGS. 1 and 2.

FIG. 4 illustrates a particularly simple, dependable and practical X-ray detector for use in the present invention. The detector illustrated includes a known type photo-conductive-cell 30 which is disposed, in an electrically insulated relation, in a suitable housing comprising a base plate 31, and a metal cap 32, which carries a transparent closure member 34 disposed opposite the light-sensitive surface 33 of the photo-conductive-cell 30, which covering may be in the form of a glass member inset into the metal cap 32. On the external surface of the cover member 34 is disposed a luminescent material 35 which is sensitive to X-rays. A sheathing 36 of synthetic resin or the like may be disposed over the material 35 and adjacent structure to protect the same. The impacting X-rays stimulate the luminescent material 35 to emit photons which strike the photo-conductive-cell 30, correspondingly reducing the resistance value thereof. Zinc-cadmium sulfide has proved to be particularly suitable as the luminescent material. However, other X-ray sensitive luminescent materials, as for example, calcium wolframate like can be employed.

Having thus described our invention it will be obvious that although various minor modifications might be suggested by those versed in the art, it should be understood that we wish to embody within the scope of the patent granted hereon all such modifications as reasonably, and properly come within the scope of our contribution to the art.

We claim as our invention:

1. In a device for inspection of objects, particularly luggage and the like, by means of X-rays originating from an X-ray generator and penetrating the object being inspected to produce an image on a fluorescent screen, which image may be directly observable or, in combination with a television circuit, indirectly observable, the combination of an X-ray detector, a photo-conductive cell having an applied layer of X-ray sensitive luminescent material, said photo-conductive cell being disposed in the beam path of the X-ray generator directly at the beam outlet opening thereof, and means operatively connected to said X-ray detector and the high voltage circuit of the X-ray generator for switching off the high voltage generator in the event the intensity and/or duration of the emitted radiation at the detector exceeds a predetermined value.

2. A device according to claim 1, wherein the X-ray detector is operable to create a current flow dependent on the dosage of the X-rays, and means including an integration amplifier to which such current flow is supplied, which is operative to cut-off the high voltage of the X-ray beam generator when a preset limit of its integrated output voltage is exceeded.

3. A device according to claim 1, wherein the luminescent material is zinc-cadmium sulphide.

4. A device according to claim 3, wherein the X-ray detector is operable to create a current flow dependent on the dosage of the X-rays, and means including an integration amplifier to which such current flow is supplied, which is operative to cut-off the high voltage of the X-ray beam generator when a preset limit of its integrated output voltage is exceeded.

5. A device according to claim 3, wherein the luminescent material is covered by a synthetic protective coating of resin.

6. A device according to claim 5, wherein the X-ray detector is a photo-conductive cell having an applied layer of X-ray sensitive luminescent material, which photo-conductive cell is disposed directly at the beam outlet opening of the X-ray generator.

* * * * *